(12) United States Patent
Garner et al.

(10) Patent No.: US 12,027,854 B2
(45) Date of Patent: *Jul. 2, 2024

(54) DETECTION OF DOWNSTREAM SMART DEVICES

(71) Applicant: ROKU, INC., San Jose, CA (US)

(72) Inventors: Gregory Mack Garner, Springdale, AR (US); David Stern, Los Gatos, CA (US); David Westerhoff, Pleasanton, CA (US); Dustin Verhoeve, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,924

(22) Filed: Oct. 31, 2022

(65) Prior Publication Data

US 2023/0117823 A1 Apr. 20, 2023

Related U.S. Application Data

(63) Continuation of application No. 17/490,990, filed on Sep. 30, 2021, now Pat. No. 11,515,726.

(51) Int. Cl.
*H05B 47/10* (2020.01)
*H01H 9/54* (2006.01)
*H02J 13/00* (2006.01)

(52) U.S. Cl.
CPC ......... *H02J 13/00036* (2020.01); *H01H 9/54* (2013.01); *H05B 47/10* (2020.01)

(58) Field of Classification Search
CPC ...... H02J 13/00036; H01H 9/54; H05B 47/10
See application file for complete search history.

(56) References Cited

U.S. PATENT DOCUMENTS 10,158,750 B2 12/2018 Dagit, III
11,515,726 B1 * 11/2022 Garner ..................... H01H 9/54
(Continued)

FOREIGN PATENT DOCUMENTS

KR 10-2018-0137785 A 12/2018

OTHER PUBLICATIONS

International Search Report and Written Opinion of the International Searching Authority directed to International Patent Application No. PCT/US2022/076780, mailed Jan. 9, 2023; 9 pages.

*Primary Examiner* — Minh D A
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for detecting downstream devices connected to an electrical load controlling device. An example embodiment operates by detecting an association signal from a downstream smart device responsive to a downstream smart device detection signal. The example embodiment further operates by determining whether the downstream smart device is coupled to an electrical terminal of an electrical switching device and configured to receive electricity in response to an actuation of the electrical switching device. If so, the example embodiment further operates by generating a control signal configured to instruct the electrical switching device to prevent a deactuation of the electrical switching device and transmitting the control signal to the electrical switching device.

20 Claims, 5 Drawing Sheets

(56) References Cited

U.S. PATENT DOCUMENTS

| | | |
|---|---|---|
| 2017/0099719 A1 | 4/2017 | Smith et al. |
| 2018/0311386 A1* | 11/2018 | Hawkins .................. A61L 2/24 |
| 2020/0067343 A1 | 2/2020 | Chen |
| 2020/0114026 A1 | 4/2020 | Rhodes et al. |
| 2020/0186861 A1 | 6/2020 | Garner |
| 2021/0067969 A1 | 3/2021 | Stern et al. |

* cited by examiner

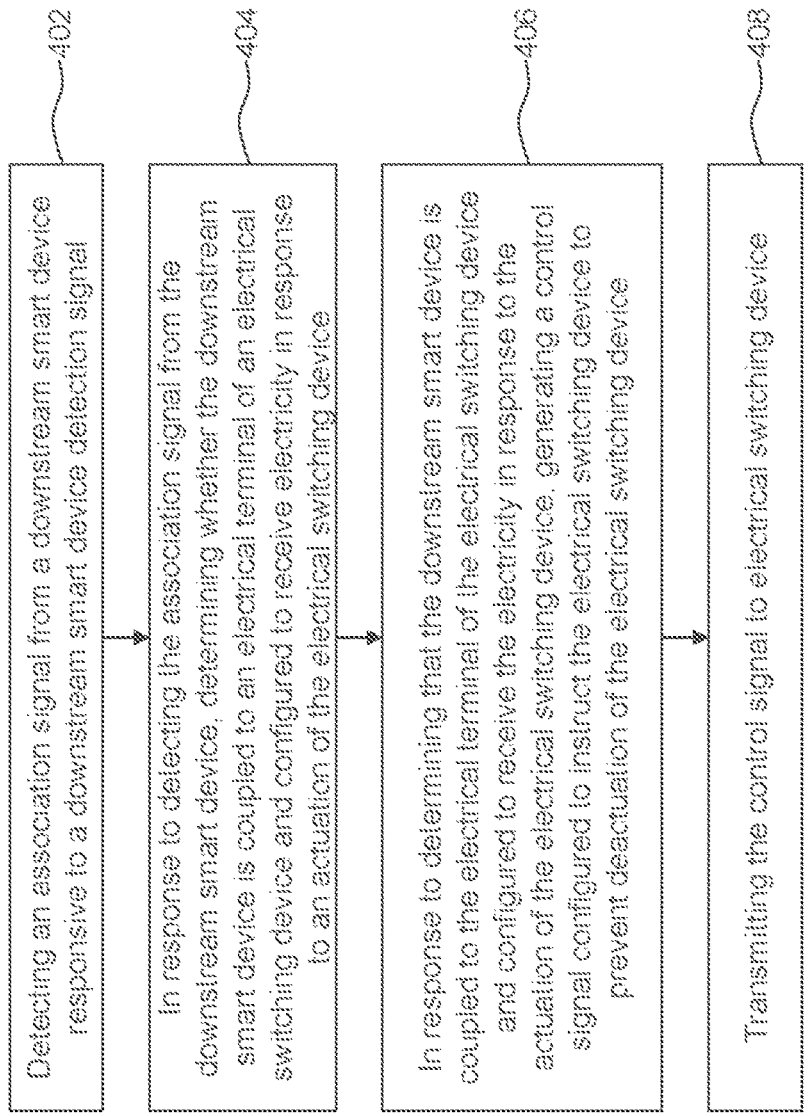

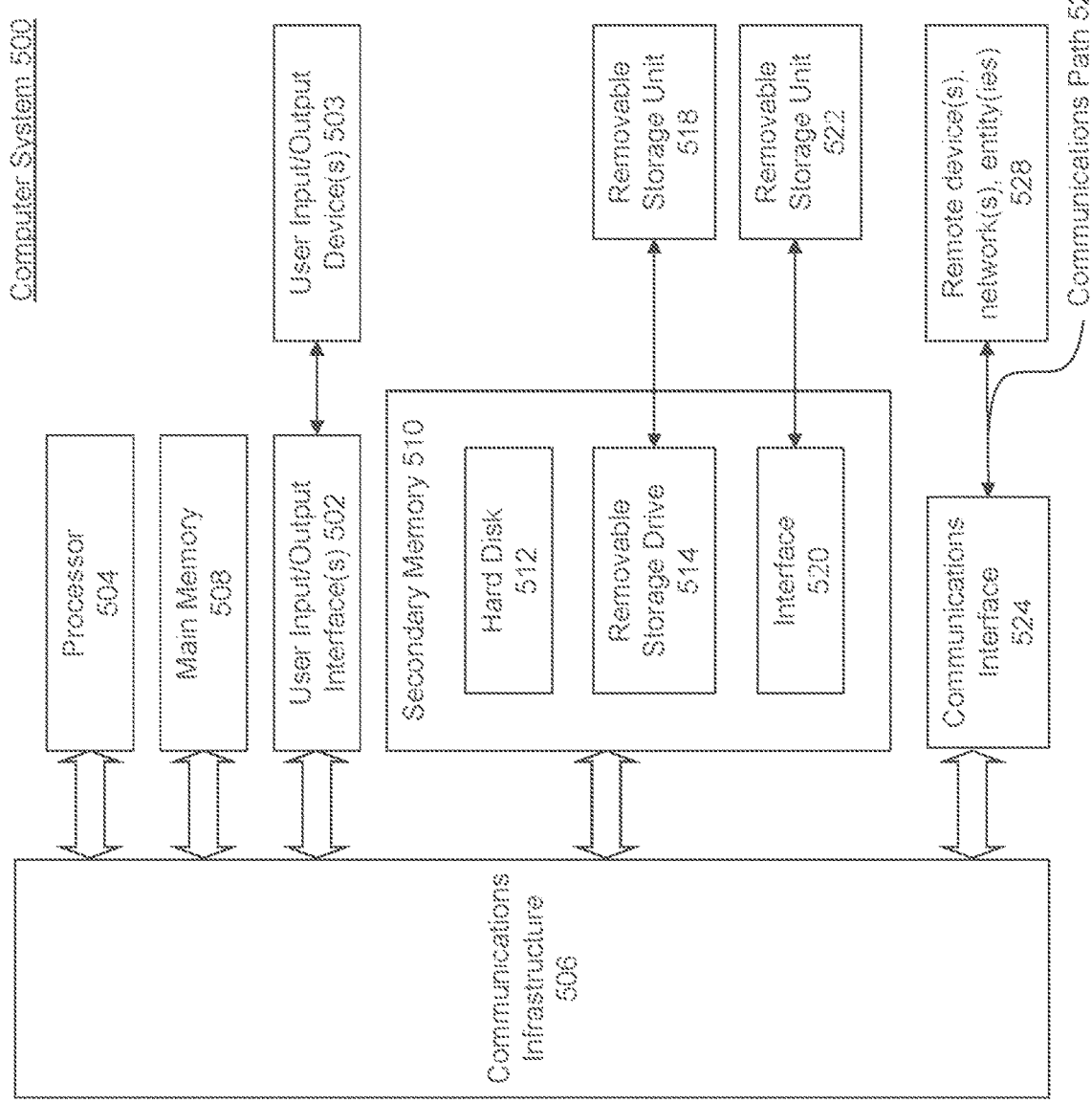

DETECTION OF DOWNSTREAM SMART DEVICES

REFERENCE TO RELATED APPLICATIONS

The present application is a continuation application and claims priority under 35 U.S.C. § 119 to U.S. non-provisional application Ser. No. 17/490,990 filed Sep. 30, 2021, the content of which is hereby incorporated by reference in their entirety.

BACKGROUND

Field

This disclosure is generally directed to electrical load control devices, and more particularly to electrical load control devices for detecting downstream smart devices.

Background

Wireless alternating-current (AC) load control devices, such as electrical switches, are used to remotely control electrical loads, such as electrical outlets and lighting devices, in residential and commercial structures. Additionally, modern Internet of things (IoT) environments have promulgated a complex web of interconnected smart devices controlled by a myriad of smart load control devices. In such environments, a user manually configures a smart load control device by adding device information for downstream smart devices, such as smart outlets and smart bulbs, using a graphical user interface (GUI) running on a separate device, such as the user's smart phone. However, such manual configuration can be overly complex for many users. Further, there is no mechanism for conventional load control devices to determine on their own which devices, smart or otherwise, are connected to their load.

SUMMARY

Provided herein are system, apparatus, article of manufacture, method and/or computer program product embodiments, and/or combinations and sub-combinations thereof, for detecting downstream devices connected to an electrical load controlling device (e.g., an alternating current (AC) load controlling device, a direct current (DC) load controlling device, or a combination thereof).

An example embodiment is directed to a computer-implemented method for detecting downstream devices connected to an electrical load controlling device. The computer-implemented method operates by detecting, by at least one processor of an electrical load controlling device, an association signal from a downstream smart device responsive to a downstream smart device detection signal. The computer-implemented method further operates by, in response to detecting the association signal, determining, by the at least one processor, whether the downstream smart device is coupled to an electrical terminal of an electrical switching device and configured to receive electricity in response to an actuation of the electrical switching device. The computer-implemented method further operates by, in response to determining that the downstream smart device is coupled to the electrical terminal of the electrical switching device and configured to receive the electricity in response to the actuation of the electrical switching device, generating, by the at least one processor, a control signal configured to instruct the electrical switching device to prevent deactuating the electrical switching device. The computer-implemented method further operates by transmitting, by the at least one processor, the control signal to the electrical switching device.

An example embodiment is directed to a non-transitory computer-readable medium having instructions stored thereon that, when executed by at least one processor of an electrical load controlling device, causes the electrical load controlling device to perform operations for detecting downstream devices. The operations include detecting an association signal from a downstream smart device responsive to a downstream smart device detection signal. The operations further include, in response to detecting the association signal, determining whether the downstream smart device is coupled to an electrical terminal of an electrical switching device and configured to receive electricity in response to an actuation of the electrical switching device. The operations further include, in response to determining that the downstream smart device is coupled to the electrical terminal of the electrical switching device and configured to receive the electricity in response to the actuation of the electrical switching device, generating a control signal configured to instruct the electrical switching device to prevent deactuating the electrical switching device. The operations further include transmitting the control signal to the electrical switching device.

An example embodiment is directed to an apparatus for detecting downstream devices connected to an electrical load controlling device. The apparatus includes a first electrical terminal configured to connect to a first ungrounded conductor and receive electricity from the first ungrounded conductor. The apparatus further includes a second electrical terminal configured to connect to a second ungrounded conductor and transmit the electricity received from the first ungrounded conductor to the second ungrounded conductor in response to an actuation of an electrical switching device. The apparatus further includes the electrical switching device. The electrical switching device is configured to generate a conductive electrical path between the first electrical terminal and the second electrical terminal in response to the actuation of the electrical switching device. The electrical switching device is further configured to generate a nonconductive electrical path between the first electrical terminal and the second electrical terminal in response to a deactuation of the electrical switching device. The apparatus further includes a memory and at least one processor coupled to the memory and configured to detect an association signal from a downstream smart device responsive to a downstream smart device detection signal. The at least one processor is further configured to, in response to a detection of the association signal, determine whether the downstream smart device is coupled to the second ungrounded conductor and configured to receive the electricity from the second ungrounded conductor in response to the actuation of the electrical switching device. The at least one processor is further configured to, in response to a determination that the downstream smart device is coupled to the second ungrounded conductor and configured to receive the electricity from the second ungrounded conductor in response to the actuation of the electrical switching device, generate a control signal configured to instruct the electrical switching device to prevent the deactuation of the electrical switching device. The at least one processor is further configured to transmit the control signal to the electrical switching device.

BRIEF DESCRIPTION OF THE FIGURES

The accompanying drawings are incorporated herein and form a part of the specification.

FIG. 4 is a flowchart illustrating a process for detecting a downstream smart device, according to some embodiments.

FIG. 5 illustrates an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for detecting downstream devices connected to an electrical load controlling device.

Figure 1:
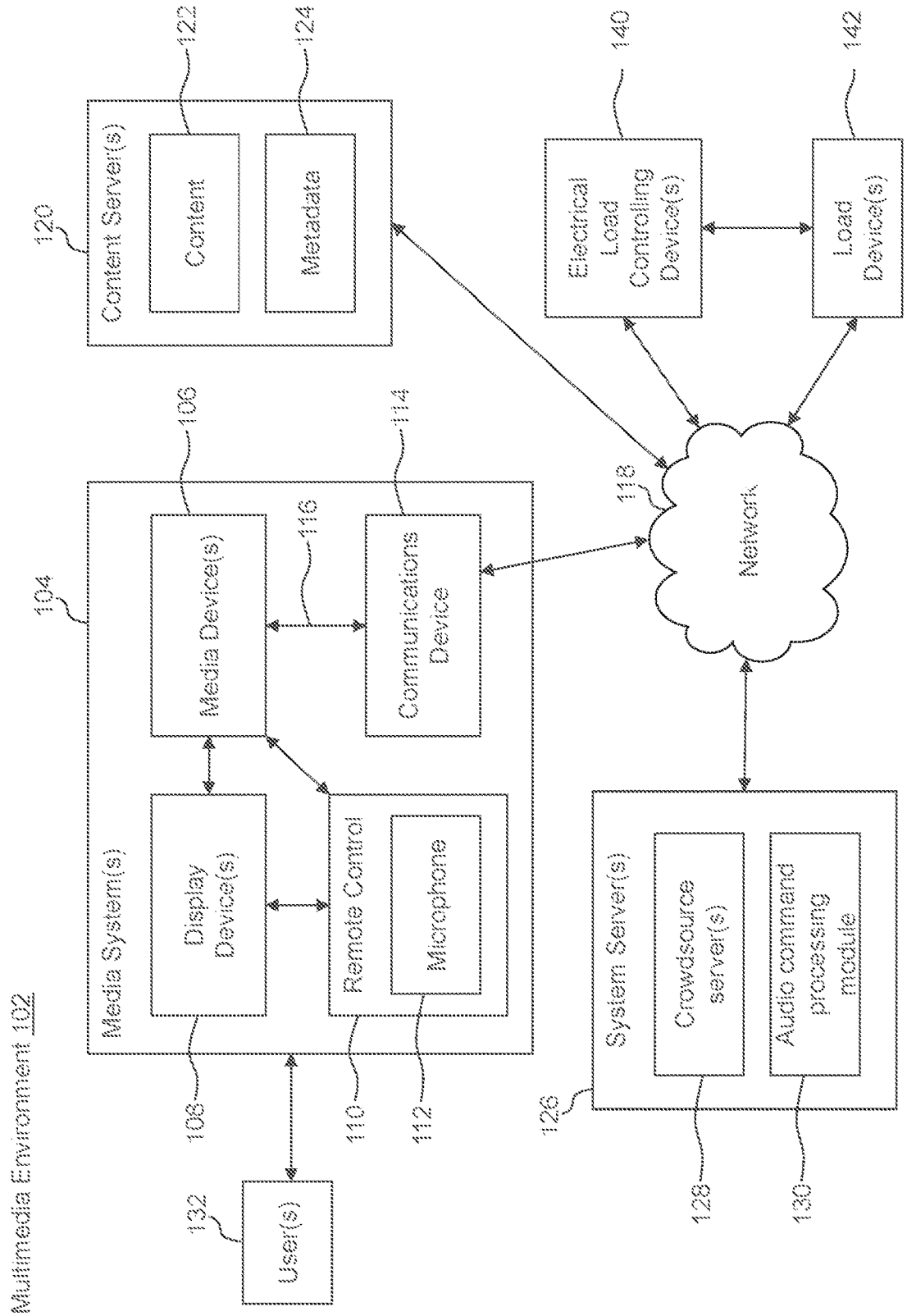
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Example Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104, one or more electrical load controlling devices 140, one or more load devices 142 and one or more content servers 120, communicatively coupled via network 118. In various embodiments, network 118 can include, without limitation, wired and/or wireless intranet, extranet, Internet, cellular, Wi-Fi, radio frequency (RF), infrared (IR), cellular, Bluetooth, Zigbee, Z-wave, and/or any other near-field, short range, long range, local, regional, global communications mechanism, means, approach, protocol and/or network, as well as any combination thereof. In some embodiments, the one or more media systems 104, one or more electrical load controlling devices 140, and one or more load devices 142 may be located in or near (e.g., within 0.5 miles of) the same residential or commercial structure (e.g., house, apartment, school, office, hospital, restaurant, shop, etc.).

A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined," and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communications device 114. The communications device 114 may include, for example, a cable modem or satellite TV transceiver. The media device 106 may communicate with the communications device 114 over a link 116, wherein the link 116 may include wireless (such as Wi-Fi) and/or wired connections.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
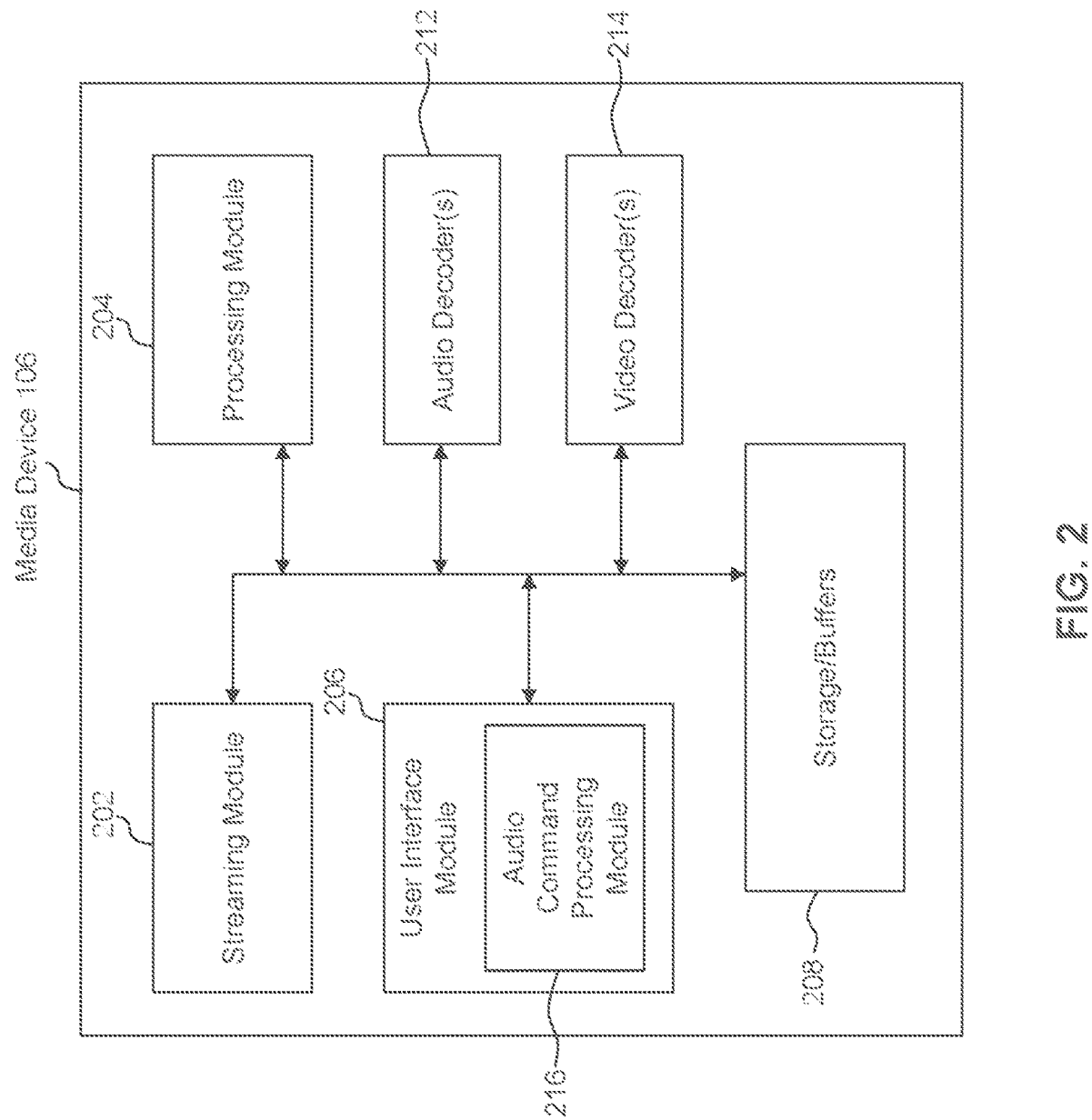
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

In some embodiments, remote control 110 may interact with one or more load devices 142 (e.g., light bulbs, dimmable light bulbs, smart light bulbs, media devices, etc.) via one or more electrical load controlling devices 140. One or more electrical load controlling devices 140 can include any component, part, apparatus or method for controlling the electrical load (e.g., alternating current (AC), direct current (DC), or both), brightness, color, status, functionality, or any other suitable characteristic of one or more load devices 142 using wireless communications, including dimming or turning on or off one or more of one or more load devices 142. For example, one or more electrical load controlling devices 140 may generate control signals corresponding to user commands and transmit the generated control signals to one or more electrical load controlling devices 140 and/or any other component in multimedia environment 102 to cause that device or component to operate according to the user commands. In some embodiments, one or more electrical load controlling devices 140 can include one or more AC load controlling devices, one or more DC load controlling devices, or any combination thereof.

In some embodiments, one or more electrical load controlling devices 140 may detect one or more downstream smart devices included in one or more load devices 142. For example, a respective electrical load controlling device 140 may detect an association signal from a downstream smart device included in one or more load devices 142, where the association signal is responsive to a downstream smart device detection signal. In response to detecting the association signal, the respective electrical load controlling device 140 may determine whether the downstream smart device is coupled to a load terminal of the respective electrical load controlling device 140. Subsequently, in response to determining that the downstream smart device is coupled to the load terminal of the respective electrical load controlling device 140, the load line of the respective electrical load controlling device 140 may enter an "always on" state, even when a user 132 attempts to switch the load line of the respective electrical load controlling device 140 to an "off" state. As a result, rather than switching the downstream smart device on and off by electrifying and de-electrifying the load line of electrical load controlling device 140, the remote control 110 and/or respective electrical load controlling device 140 may switch the downstream smart device on and off, dim the downstream smart device, and/or change the characteristics (e.g., color, etc.) of the downstream smart device by transmitting a control signal to the downstream smart device that is configured to instruct the downstream smart device to turn itself on or off, dim itself, and/or change one or more of its characteristics.

In some embodiments, one or more electrical load controlling devices 140 can include a control point (e.g., a switch or a dimmer switch), and one or more load devices 142 can include a downstream smart device such as a downstream smart bulb. Various techniques may be utilized to detect the downstream smart device and then use the network 118, rather than the control point, to control the downstream smart device. One technique may utilize a power sensor in the control point to detect a sequence of power pulses from the downstream device. For example, the downstream device can modulate its power consumption or otherwise vary its load according to a predetermined sequence by dimming itself two or three times, changing colors (e.g., red, then green, then blue), performing operations similar to a code-division multiple access (CDMA) pulse train, transmitting a Wi-Fi packet, and the control point can use a power sensor to detect that sequence or current increase and identify the device as a downstream smart device. In another technique, when the control point removes power from the downstream device, then the control point can detect that the downstream device loses and gains power exactly the same time and so correlate it. For example, if the downstream device goes off network when the control point removes power, the control point can identify that device as a downstream smart device. In yet another technique, the control point may dim the downstream device in a predetermined pattern (e.g., a chirp), and then the downstream device can detect the sequence and associate with the control point.

In some embodiments, one or more electrical load controlling devices 140 can perform the operations disclosed herein to determine which of the one or more load devices 142 are electrically downstream of which of the one or more electrical load controlling devices 140. For example, when there are multiple electrical load controlling devices 140 connected in series, one of the electrical load controlling devices 140 can perform the techniques described herein for all of the other electrical load controlling devices 140. In another example, when there are multiple electrical load controlling devices 140 connected in parallel, one of the electrical load controlling devices 140 (e.g., a 3-way switch connected to a neutral wire) can perform the techniques described herein so long as all of the other electrical load controlling devices 140 are in an "off" state. In yet another example, the multiple electrical load controlling devices 140 can perform a "leader election" operation to identify which of the electrical load controlling devices 140 should perform the techniques described herein.

In some embodiments, the downstream device detection techniques described herein can simplify the processes for adding IoT devices to a home by determining which smart devices are on the load of which control points. For example, when there are two control points and two smart outlets, the disclosed techniques can determine automatically and without user interaction which switch is connected to which outlet.

In some embodiments, one or more electrical load controlling devices 140 can function both with and without a neutral wire. For example, when an electrical load controlling device 140 boots up, it can detect the presence or absence of the neutral wire.

In an embodiment, if the neutral wire is present, then electrical load controlling device 140 can put itself into a more full-featured mode where it can perform functions such as having capacitive sensing functionality always on, or using a power hungry wireless communications protocol (e.g., Wi-Fi mesh, Bluetooth, or 5G). In other words, if the neutral wire is present, electrical load controlling device 140 can enable other more complex energy intensive features.

In an embodiment, if the neutral wire is not present, then electrical load controlling device 140 can limit the enabled features to be the bare minimum features that will work when minimal power is available. For example, electrical load controlling device 140 can stay sleeping until a user presses a physical button on electrical load controlling device 140 or performs some other physical motion to wake up electrical load controlling device 140, in which case electrical load controlling device 140 uses a low power mechanism to send out the Wi-Fi command to the load device 142 being controlled. In another example, electrical load controlling device 140 may transmit updates to, or receive updates from, outside devices at a reduced frequency (e.g., look for control packets once a second). As a result, the one or more electrical load controlling devices 140 can modify their functionality based on the neutral wire presence.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Figure 3:
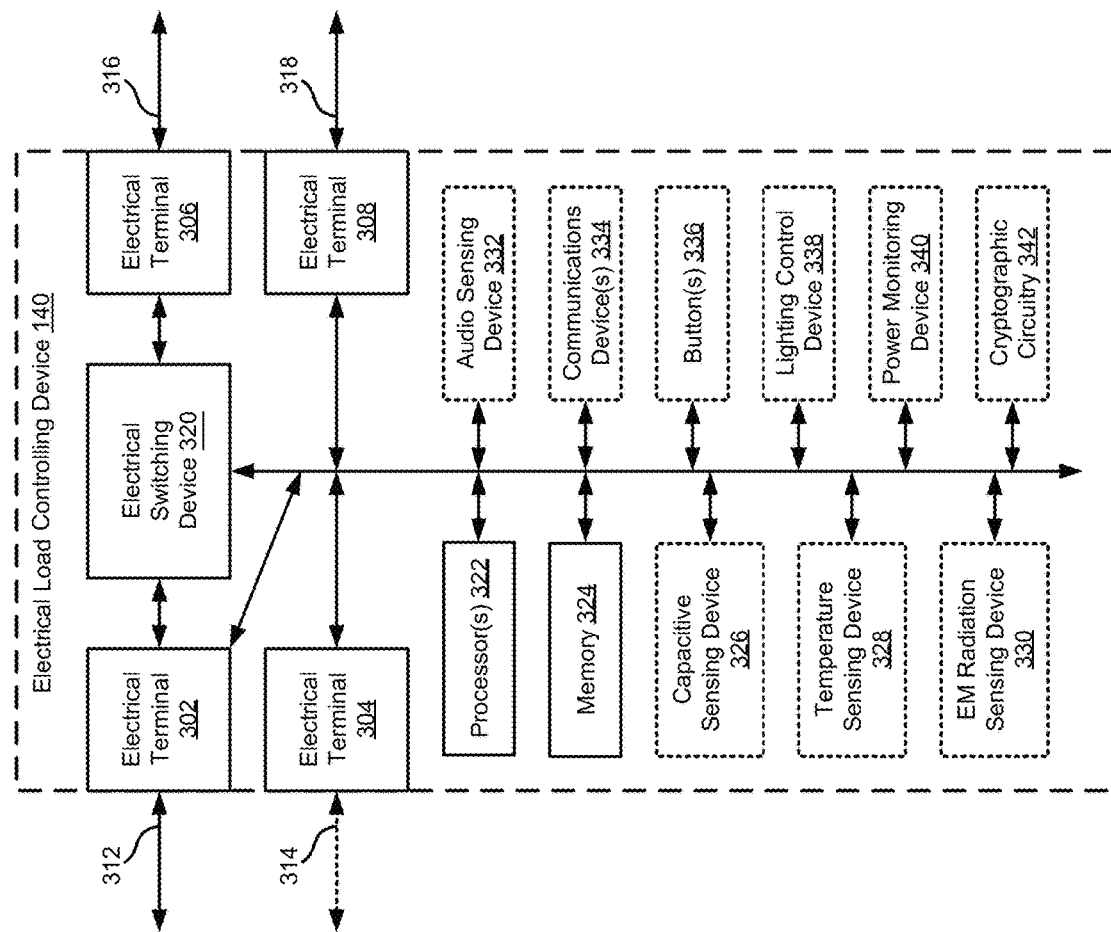
FIG. 3 is a block diagram of an electrical load controlling device, according to some embodiments.

FIG. 3 illustrates an example block diagram of electrical load controlling device 140, according to some embodiments. Electrical load controlling device 140 may include, for example, first electrical terminal 302, fourth electrical terminal 304, second electrical terminal 306, third electrical terminal 308, electrical switching device 320, one or more processors 322, memory 324, capacitive sensing device 326 (e.g., a touch detector), temperature sensing device 328 (e.g., thermocouple, thermistor), electromagnetic (EM) radiation sensing device 330 (e.g., an ambient light detector such as a photodetector, an IR sensor), audio sensing device 332 (e.g., a microphone, microphone array), one or more communications devices 334 (including, but not limited to, a wireless communications device), set of buttons 336 (e.g., one or more actuator devices (e.g., a motor), dimmer switches (e.g., rotatable or sliding), physical buttons, virtual buttons, soft buttons, touchscreen areas, augmented reality (AR) buttons, virtual reality (VR) buttons, any other suitable buttons, or any combination thereof), lighting control device 338, power monitoring device 340, cryptographic circuitry 342, any other suitable hardware, software, device, or structure, or any combination thereof.

Now referring to FIGS. 1, 2, and 3, in some embodiments, electrical load controlling device 140 may include a first electrical terminal 302 configured to connect to a first ungrounded conductor 312 (e.g., a black-coated hot or line electrical wire) and receive electricity from the first ungrounded conductor 312. Electrical load controlling device 140 may further include a second electrical terminal 306 configured to connect to a second ungrounded conductor 316 (e.g., a red-coated or black-coated load electrical wire) and transmit a first portion of the electricity received from the first ungrounded conductor 312 to the second ungrounded conductor 316 in response to an actuation of an electrical switching device 320. Electrical load controlling device 140 may further include a third electrical terminal 308 configured to connect to a grounding conductor 318 (e.g., a green-coated or uncoated ground electrical wire). Electrical load controlling device 140 may further include a fourth electrical terminal 304 configured to connect to a grounded conductor 314 (e.g., a white-coated neutral electrical wire) and transmit a second portion of the electricity received from the first ungrounded conductor 312 to the grounded conductor 314 in response to a connection of the fourth electrical terminal 304 to the grounded conductor 314. In one illustrative example, the first ungrounded conductor 312 can be a line wire, the grounded conductor 314 can be a neutral wire (e.g., which may or may not be present), the second ungrounded conductor 316 can be a load wire, and the grounding conductor can be a ground wire.

Electrical load controlling device 140 may further include electrical switching device 320 (e.g., a dimmable electrical switch). Electrical switching device 320 may be configured to generate a conductive or variably-conductive electrical path between the first electrical terminal 302 and the second electrical terminal 306 in response to the actuation of electrical switching device 320. In an embodiment, electrical switching device 320 may be actuated in response to receiving a mechanical or electronic signal indicative of an "on" or "dim" command having been input by a user or generated by electrical load controlling device 140 to control (e.g., turn on or dim) a load device 142 connected to the second electrical terminal 306 via the second ungrounded conductor 316. Electrical switching device 320 may receive the mechanical or electronic signal indicative of the "on" or "dim" command from, for example, one or more processors 322, memory 324 (e.g., based on a temporal schedule), capacitive sensing device 326, temperature sensing device 328, EM radiation sensing device 330, audio sensing device 332, one or more buttons in the set of buttons 336, lighting control device 338, power monitoring device 340, remote control 110, any other suitable device, or any combination thereof.

Electrical switching device 320 may be further configured to generate a nonconductive electrical path between the first electrical terminal 302 and the second electrical terminal 306 in response to a deactuation of the electrical switching device. In an embodiment, electrical switching device 320 may be deactuated in response to receiving a mechanical or electronic signal indicative of an "off" command having been input by a user or generated by electrical load controlling device 140 to control (e.g., turn off) a load device 142 connected to the second electrical terminal 306 via the second ungrounded conductor 316. Electrical switching device 320 may receive the mechanical or electronic signal indicative of the "off" command from, for example, one or more processors 322, memory 324, capacitive sensing device 326, temperature sensing device 328, EM radiation sensing device 330, audio sensing device 332, one or more buttons in the set of buttons 336, lighting control device 338, power monitoring device 340, remote control 110, any other suitable device, or any combination thereof.

Electrical switching device 320 may be further configured to receive a control signal from one or more processors 322, any other suitable device, or any combination thereof, configured to instruct electrical switching device 320 to enter an "always actuated" state that prevents the deactuation of electrical switching device 320. For example, electrical switching device 320 may receive such a control signal in response to electrical load controlling device 140 detecting a downstream smart device coupled to the second ungrounded conductor 316 (e.g., the load wire).

Electrical load controlling device 140 may further include a memory 324 and one or more processors 322 coupled to the memory 324 and configured to detect a downstream smart device coupled to the second ungrounded conductor 316 (e.g., the load wire) and, in response, generate a control signal configured to instruct electrical switching device 320 to prevent the deactuation of electrical switching device 320 and transmit the control signal to electrical switching device 320.

In one example embodiment, electrical load controlling device 140 may include a power monitoring device 340 configured to detect a downstream smart device coupled to the second ungrounded conductor 316 by detecting a predetermined sequence of power pulses from the downstream smart device.

In another example embodiment, one or more communications devices 334 may be further configured to detect a downstream smart device coupled to the second ungrounded conductor 316 by detecting a communications signal from the downstream smart device when the electrical switching device 320 is actuated (e.g., the second ungrounded conductor 316 is electrified) and detecting no communications signal from the downstream smart device when the electrical switching device 320 is de-actuated (e.g., the second ungrounded conductor 316 is not electrified).

In another example embodiment, such as when the downstream smart device is a dimmable smart light bulb, electrical load controlling device 140 may include an EM radiation sensing device 330 configured to detect a dimming of the dimmable smart light bulb according to the predetermined dimming sequence. Additionally or alternatively, power monitoring device 340 may be configured to detect the dimming of the dimmable smart light bulb according to the predetermined dimming sequence.

In another example embodiment, electrical load controlling device 140 may instruct the downstream smart device to transmit a Wi-Fi packet and the power monitoring device 340 may detect that the downstream smart device is coupled to the second ungrounded conductor 316 by detecting a current increase on the second ungrounded conductor 316 corresponding to the time at which the downstream smart device transmits the Wi-Fi packet.

In some embodiments, electrical load controlling device 140 can include a non-transitory computer-readable medium having instructions stored thereon that, when executed by one or more processors 322 of electrical load controlling device 140, causes electrical load controlling device 140 to perform operations including: (i) detecting an association signal from a downstream smart device responsive to a downstream smart device detection signal; (ii) in response to detecting the association signal, determining whether the downstream smart device is coupled to second ungrounded conductor 316 and configured to receive electricity in response to an actuation of electrical switching device 320; (iii) in response to determining that the downstream smart device is coupled to second ungrounded conductor 316 and configured to receive electricity in response to an actuation of electrical switching device 320, generating a control signal configured to instruct electrical switching device 320 to prevent deactuation of electrical switching device 320 and thereby enter an "always on" state; and (iv) transmitting the control signal to electrical switching device.

In some embodiments, one or more processors 322 may be further configured to determine whether the fourth electrical terminal 304 is connected to the grounded conductor 314. The one or more processors 322 may be further configured to generate, in response to a first determination that the fourth electrical terminal 304 is connected to the grounded conductor 314, a first control signal configured to permit the performance of a function. The function may include, for example, a capacitive sensing function, a temperature sensing function, a radiation sensing function, an audio sensing function, a wireless communications function, a dimmer switch modification function, a lighting control function, any other suitable function, or any combination thereof. The one or more processors 322 may be further configured to generate, in response to a second determination that the fourth electrical terminal 304 is not connected to the grounded conductor 314, a second control signal configured to prevent the performance of the function. In an embodiment, the first control signal can be configured to permit the performance of a set of functions that includes the function, and the second control signal can be configured to permit the performance of a subset of the set of functions that does not include the function.

In one example embodiment, electrical load controlling device 140 may include a capacitive sensing device 326 and the function may include a capacitive sensing function, such as an "always on" capacitive sensing function. The first control signal may be configured to instruct the capacitive sensing device 326 to permit the performance of the capacitive sensing function, whereas the second control signal may be configured to instruct the capacitive sensing device 326 to prevent the performance of the capacitive sensing function.

In another example embodiment, electrical load controlling device 140 may include a temperature sensing device 328 and the function may include a temperature sensing function. The first control signal may be configured to instruct the temperature sensing device 328 to permit the performance of the temperature sensing function, whereas the second control signal may be configured to instruct the temperature sensing device 328 to prevent the performance of the temperature sensing function.

In another example embodiment, the function may include a radiation sensing function (e.g., daylight detection). The first control signal may be configured to instruct the EM radiation sensing device 330 to permit the performance of the radiation sensing function, whereas the second control signal may be configured to instruct the EM radiation sensing device 330 to prevent the performance of the radiation sensing function.

In another example embodiment, electrical load controlling device 140 may include an audio sensing device 332 and the function may include an audio sensing function. The first control signal may be configured to instruct the audio sensing device 332 to permit the performance of the audio sensing function, whereas the second control signal may be configured to instruct the audio sensing device 332 to prevent the performance of the audio sensing function.

In another example embodiment, electrical load controlling device 140 may include one or more communications devices 334, including but not limited to a wireless communications device, and the function may include a wireless communications function (e.g., Wi-Fi mesh, Bluetooth, 5G). The first control signal may be configured to instruct the wireless communications device to permit the performance of the wireless communications function, whereas the second control signal may be configured to instruct the wireless communications device to prevent the performance of the wireless communications function.

In another example embodiment, electrical load controlling device 140 may include a set of buttons 336, including but not limited to an actuator device and a dimmer switch, and the function may include a dimmer switch modification function configured to modify a physical position of the dimmer switch using the actuator device. The first control signal may be configured to instruct the actuator device to permit the performance of the dimmer switch modification function, whereas the second control signal may be configured to instruct the actuator device to prevent the performance of the dimmer switch modification function.

In another example embodiment, electrical load controlling device 140 may include a lighting control device 338 and the function may include a lighting control function configured to control the brightness, color, status, functionality, or any other suitable characteristic of one or more lighting devices included in one or more load devices 142 (e.g., to make the color temperature of a lighting device warmer in the morning and cooler in the evening). The first control signal may be configured to instruct the lighting control device 338 to permit the performance of the lighting control function, whereas the second control signal may be configured to instruct the lighting control device 338 to prevent the performance of the lighting control function.

In another example embodiment, the power monitoring device 340 may be further configured to detect an electrical current between the first electrical terminal 302 and the fourth electrical terminal 304. The one or more processors 322 may be configured to determine the function based on the detected electrical current. For example, the one or more processors 322 may be configured to permit the performance of a set of functions including a first function, a second function, and a third function (e.g., three different functions described herein; controlling three different load devices, such as a first load device, a second load device, and a third device, respectively, of the one or more load devices 142; etc.) when the grounded conductor 314 is connected to the fourth electrical terminal 304 and electrical switching device 320 is nonconductive (e.g., the load device 142 is in an "off" position). In another example, the one or more processors 322 may be configured to permit the performance of a first subset of the set of functions including the first function and the second function but not the third function when the grounded conductor 314 is connected to the fourth electrical terminal 304 and electrical switching device 320 is in a partially conductive state (e.g., the load device 142 is in a "dimmed" position). In yet another example, the one or more processors 322 may be configured to permit the performance of a second subset of the set of functions including the first function but not the second function or the third function when the grounded conductor 314 is connected to the fourth electrical terminal 304 and electrical switching device 320 is in a fully conductive state (e.g., the load device 142 is in an "on" position). In still another example, the one or more processors 322 may be configured to permit the performance of a third subset of the set of functions that includes neither the first function nor the second function nor the third function when the grounded conductor 314 is not connected to the fourth electrical terminal 304.

In another example embodiment, when the fourth electrical terminal 304 is not connected to a grounded conductor 314, electrical load controlling device 140 may be configured to offload the performance of the function to another electrical load controlling device, the media device 106, or the remote control 110. For example, electrical load controlling device 140 may include one or more communications devices 334 configured to communicate with a media device 106. In response to the second determination that the fourth electrical terminal 304 is not connected to the grounded conductor 314, the one or more processors 322 may be configured to generate a third control signal configured to instruct the media device 106 to permit the performance of the function and transmit, using the one or more communications devices 334, the third control signal to the media device 106. In response to receiving the third control signal from electrical load controlling device 140, media device 106 may generate: an acknowledgement (ACK) signal, frame, or packet; a negative-acknowledgement (NACK) signal, frame, or packet; results data (e.g., measurement data, any other suitable data, or any combination thereof) corresponding to the performance of the function by the media device 106; or any other suitable signal, frame, packet, or data structure. For example, an ACK signal may be indicative of an acknowledgement that media device 106 has received the third control signal. In another example, a NACK signal may be indicative of an error or that media device 106 has not received the third control signal. Subsequently, electrical load controlling device 140 can be configured to receive (e.g., by the one or more communications devices 334, any other suitable hardware or software, or any combination thereof) the ACK signal, NACK signal, results data, any other suitable data, or a combination thereof from media device 106.

In another example embodiment, electrical load controlling device 140 may be configured to control a media device 106 connected to the second ungrounded conductor 316 (e.g., the load wire). For example, the second electrical terminal 306 may be configured to transmit the electricity to a media device 106 through the second ungrounded conductor 316 in response to the actuation of electrical switching device 320. Electrical load controlling device 140 may include one or more communications devices 334 configured to communicate with the media device 106. The first control signal may be configured to instruct the media device 106 to permit the performance of the function, whereas the second control signal is configured to instruct the media device 106 to prevent the performance of the function. Subsequently, the one or more processors 322 may be configured to transmit, using the one or more communications devices 334, the first control signal or the second control signal to the media device 106.

In an embodiment, electrical load controlling device 140 may be configured to generate (e.g., by set of buttons 336, capacitive sensing device 326, audio sensing device 332, one or more processors 322, any other suitable circuitry or structures, or any combination thereof) electronic signals indicative of user commands. A user command may correspond to one or more pressed buttons, audio commands, gesture commands, any other suitable commands input, uttered, or motioned by a user, or any combination thereof.

In an embodiment, a user may enter commands on electrical load controlling device 140 by pressing one or more of the capacitive sensing device 326 or the set of buttons 336, such as on/off, brightness up/down, color change, to name just a few examples. In such aspects, capacitive sensing device 326, set of buttons 336, any circuitry or structures connected thereto, one or more processors 322, or a combination thereof may generate an electronic signal indicative of a button having been pressed by a user in response to the user pressing the button and capacitive sensing device 326, set of buttons 336, any circuitry or structures connected thereto, one or more processors 322, or a combination thereof detecting a change in an electrical resistance, impedance, or capacitance associated with the pressed button.

Additionally or alternatively, in an embodiment, a user may enter commands on electrical load controlling device 140 by uttering a command within audible range of audio sensing device 332. For example, to turn on a load device 142 connected to electrical load controlling device 140, the user may say "Light On." In an embodiment, the user may say a trigger word before saying commands, to better enable electrical load controlling device 140 to distinguish between commands and other spoken words. For example, the trigger word may be "Command." In this case, to turn on the load device 142, the user may say "Command Light Up." In an embodiment, there may be one or more trigger words that are recognized by electrical load controlling device 140. In such aspects, one or more processors 322 may generate an electronic signal indicative of an audio command having been spoken by a user in response to the user speaking the audio command and audio sensing device 332, any circuitry or structures connected thereto, one or more processors 322, or a combination thereof detecting an audio signal associated with the command.

In an embodiment, electrical load controlling device 140 may be configured to encrypt (e.g., by cryptographic circuitry 342, one or more processors 322, any other suitable circuitry or structures, or any combination thereof) communications using a symmetric cryptographic technique, an asymmetric cryptographic technique, any other suitable cryptographic technique, or any combination thereof. Thereafter, media device 106 may be configured to receive and decrypt the encrypted communications using any suitable technologies, and perform the function associated with the communication.

In an embodiment, electrical load controlling device 140 may periodically come to a pre-defined frequency on a periodic basis to exchange communications, communications channel identification information, cryptographic information, any other suitable information, or any combination thereof, with other devices. For example, electrical load controlling device 140 may periodically come to a 2.4 GHz communications channel every 5, 10, 15, 30, 45, or 60 minutes to exchange communications, communications channel identification information, cryptographic information, any other suitable information, or any combination thereof.

In another example embodiment, when the fourth electrical terminal 304 is connected to a grounded conductor 314, electrical load controlling device 140 may be configured to function as a gateway for other electrical load controlling devices that do not have neutral wires or are running on battery power.

In some embodiments, electrical load controlling device 140 can include a non-transitory computer-readable medium having instructions stored thereon that, when executed by one or more processors 322 of electrical load controlling device 140, causes electrical load controlling device 140 to perform operations including: (i) determining whether an electrical terminal 304 of electrical load controlling device 140 is connected to a grounded conductor 314; (ii) generating, in response to determining that the fourth electrical terminal 304 is connected to the grounded conductor 314, a first control signal configured to permit electrical load controlling device 140 to perform a function; and (iii) generating, in response to determining that the fourth electrical terminal 304 is not connected to the grounded conductor 314, a second control signal configured to prevent electrical load controlling device 140 from performing the function. In some embodiments, the first control signal can be configured to permit the performance of a set of functions that includes the function, whereas the second control signal can be configured to permit the performance of a subset of the set of functions, wherein the subset of the set of functions does not include the function. In some embodiments, the operations may further include: (iv) detecting an electrical current between the fourth electrical terminal 304 and the first electrical terminal 302 connected to the first ungrounded conductor 312; and (v) determining the function based on the detected electrical current. In some embodiments, the operations may further include: (vi) generating, by the one or more processors 322 in response to determining that the fourth electrical terminal 304 is not connected to the grounded conductor 314, a third control signal configured instruct a media device 106 to permit the performance of the function; and (vii) transmitting, by one or more communications devices 334 of electrical load controlling device 140, the third control signal to the media device 106. In some embodiments, the first control signal can be configured to instruct a media device 106 to permit the performance of the function, the second control signal can be configured to instruct the media device 106 to prevent the performance of the function, and the operations may further include (viii) transmitting the first control signal or the second control signal to the media device 106.

FIG. 4 is a flowchart for a method 400 for detecting downstream devices, according to an embodiment. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to those example embodiments.

In 402, electrical load controlling device 140 detects (e.g., by one or more processors 322, any other suitable hardware or software, or any combination thereof) an association signal from a downstream smart device (e.g., a smart device included in one or more load devices 142) responsive to a downstream smart device detection signal. Optionally, before 402, electrical load controlling device 140 can transmit the downstream smart device detection signal to the downstream smart device (e.g., directly or indirectly via network 118, such as in a broadcast, multicast, unicast, or other Wi-Fi, Bluetooth, Zigbee, or Z-wave communication). Optionally, before 402, the downstream smart device can incorporate the downstream smart device detection signal and be configured to transmit periodic responses (e.g., when powered on, periodically (e.g., every five minutes), etc.). In response to detecting the association signal from the downstream smart device, method 400 proceeds to 404.

In 404, electrical load controlling device 140 determines (e.g., by one or more processors 322, any other suitable hardware or software, or any combination thereof) whether the downstream smart device is coupled to an electrical terminal (e.g., second ungrounded conductor 316) and configured to receive electricity in response to an actuation of an electrical switching device (e.g., electrical switching device 320). In response to determining that the downstream smart device is coupled to the electrical terminal and configured to receive the electricity in response to the actuation of the electrical switching device, method 400 proceeds to 406.

In 406, electrical load controlling device 140 generates (e.g., by one or more processors 322, any other suitable hardware or software, or any combination thereof) a control signal configured to instruct the electrical switching device to prevent deactuating the electrical switching device. For example, the control signal can be configured to instruct the electrical switching device to be in an "always on" state, even when a user attempts to switch the electrical switching device to an "off" state. As a result, the downstream smart device may be switched on and off via an internal switch included in the downstream smart device rather than by the electrical switching device included in electrical load controlling device 140.

In 408, electrical load controlling device 140 transmits (e.g., by one or more processors 322, one or more communications devices 334, any other suitable hardware or software, or any combination thereof) the control signal to the electrical switching device.

In one illustrative and non-limiting example embodiment, the downstream smart device detection signal can be configured to instruct the downstream smart device to generate a predetermined sequence of power pulses, and, in 402, the detected association signal can include the predetermined sequence of power pulses. In 404, in response to detecting the predetermined sequence of power pulses from the downstream smart device, electrical load controlling device 140 can determine that the downstream smart device is coupled to the electrical terminal and configured to receive the electricity in response to the actuation of the electrical switching device.

In another illustrative and non-limiting example embodiment, the downstream smart device detection signal can be a first downstream smart device detection signal configured to instruct the downstream smart device to transmit a communications signal. Electrical load controlling device 140 can transmit (e.g., by one or more communications devices 334, any other suitable hardware or software, or any combination thereof) a second downstream smart device detection signal to the electrical switching device. The second downstream smart device detection signal can be configured to instruct the electrical switching device to actuate and deactuate the electrical switching device according to a predetermined actuation and deactuation sequence. Electrical load controlling device 140 can receive (e.g., by one or more communications devices 334, any other suitable hardware or software, or any combination thereof), at a first time when the electrical switching device is actuated based on the second downstream smart device detection signal, the communications signal from the downstream smart device. Electrical load controlling device 140 can not receive, at a second time when the electrical switching device is deactuated based on the second downstream smart device detection signal, the communications signal from the downstream smart device. In 404, to in response to receiving the communications signal from the downstream smart device at the first time and not receiving the communications signal from the downstream smart device at the second time, electrical load controlling device 140 can determine that the downstream smart device is coupled to the electrical terminal and configured to receive the electricity in response to the actuation of the electrical switching device.

In yet another illustrative and non-limiting example embodiment, the downstream smart device can be a dimmable smart light bulb, and the downstream smart device detection signal can be configured to instruct the dimmable smart light bulb to dim the dimmable smart light bulb according to a predetermined dimming sequence. In 402, the detected association signal can include a dimming of the dimmable smart light bulb according to the predetermined dimming sequence. In 402, electrical load controlling device 140 can detect (e.g., by one or more processors 322, EM radiation sensing device 330, power monitoring device 340, any other suitable hardware or software, or any combination thereof) the dimming of the dimmable smart light bulb according to the predetermined dimming sequence. In 404, in response to detecting the dimming of the dimmable smart light bulb according to the predetermined dimming sequence, electrical load controlling device 140 can determine that the downstream smart device is coupled to the electrical terminal and configured to receive the electricity in response to the actuation of the electrical switching device.

In still another illustrative and non-limiting example embodiment, the downstream smart device can be a dimmable smart light bulb, and the downstream smart device detection signal can be configured to instruct the dimmable smart light bulb to dim the dimmable smart light bulb according to a predetermined dimming sequence. The downstream smart device can be configured to, in response to a receipt of the downstream smart device detection signal, transmit a control point association signal (e.g., containing the downstream smart device's address, endpoint identifier, cluster identifier, attributes, etc.) to electrical load controlling device 140. In 402, the detected association signal can include the control point association signal. In 404, in response to receiving the control point association signal from the downstream smart device, electrical load controlling device 140 can determine that the downstream smart device is coupled to the electrical terminal and configured to receive the electricity in response to the actuation of the electrical switching device. For example, electrical load controlling device 140 can use a field effect transistor (FET) to "dim" the load line (e.g., turn the AC off for a portion of a 16 ms cycle) according to a particular curve, and then the downstream smart device can broadcast a message that contains the received dimming curve it received so that electrical load controlling device 140 can determine which downstream smart device it is attached to.

In some embodiments, the term "downstream smart device detection signal" can refer to a signal that is transmitted and received over Wi-Fi. In some embodiments, the phrase "actuation of the electrical switching device" can refer to a modulation of the power line.

Example Computer System

Various embodiments may be implemented, for example, using one or more computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as one or more processors 504. In some embodiments, one or more processors 504 may be connected to a communications infrastructure 506 (e.g., a bus).

Computer system 500 may also include user input/output device(s) 503, such as monitors, keyboards, pointing devices, etc., which may communicate with communications infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508 (e.g., a primary memory or storage device), such as random access memory (RAM). Main memory 508 may include one or more levels of cache. Main memory 508 may have stored therein control logic (i.e., computer software) and/or data.

Computer system 500 may also include one or more secondary storage devices or memories such as secondary memory 510. Secondary memory 510 may include, for example, a hard disk drive 512, a removable storage drive 514 (e.g., a removable storage device), or both. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (e.g., control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communications interface 524 (e.g., a network interface). Communications interface 524 may enable computer system 500 to communicate and interact with any combination of external devices, external networks, external entities, etc. (individually and collectively referenced by reference number 528). For example, communications interface 524 may allow computer system 500 to communicate with external devices 528 (e.g., remote devices) over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with various or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 500, main memory 508, secondary memory 510, removable storage unit 518, and removable storage unit 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method, comprising:
   detecting, by at least one processor of an electrical load controlling device, an association signal from a downstream smart device responsive to a downstream smart device detection signal;
   in response to detecting the association signal, determining, by the at least one processor, whether the downstream smart device is coupled to an electrical terminal of an electrical switching device and configured to receive electricity in response to an actuation of the electrical switching device;
   in response to determining that the downstream smart device is coupled to the electrical terminal of the electrical switching device and configured to receive the electricity in response to the actuation of the electrical switching device, generating, by the at least one processor, a control signal configured to instruct the electrical switching device to prevent deactuating the electrical switching device; and
   transmitting, by the at least one processor, the control signal to the electrical switching device.

2. The computer-implemented method of claim 1, wherein:
   the downstream smart device detection signal is configured to instruct the downstream smart device to generate a predetermined sequence of power pulses;
   the association signal comprises the predetermined sequence of power pulses; and
   the computer-implemented method further comprises:
      in response to detecting the predetermined sequence of power pulses from the downstream smart device, determining, by the at least one processor, that the downstream smart device is coupled to the electrical terminal of the electrical switching device and configured to receive the electricity in response to the actuation of the electrical switching device.

3. The computer-implemented method of claim 1, wherein:
the downstream smart device detection signal is a first downstream smart device detection signal;
the first downstream smart device detection signal is configured to instruct the downstream smart device to transmit a communications signal, and
the computer-implemented method further comprises:
transmitting, by the at least one processor, a second downstream smart device detection signal to the electrical switching device,
wherein the second downstream smart device detection signal is configured to instruct the electrical switching device to actuate and deactuate the electrical switching device according to a predetermined actuation and deactuation sequence;
receiving, by the at least one processor at a first time, when the electrical switching device is actuated based on the second downstream smart device detection signal, the communications signal from the downstream smart device;
not receiving, by the at least one processor at a second time when the electrical switching device is deactuated based on the second downstream smart device detection signal, the communications signal from the downstream smart device; and
in response to receiving the communications signal from the downstream smart device at the first time and not receiving the communications signal from the downstream smart device at the second time, determining, by the at least one processor, that the downstream smart device is coupled to the electrical terminal of the electrical switching device and configured to receive the electricity in response to the actuation of the electrical switching device.

4. The computer-implemented method of claim 1, wherein:
the downstream smart device is a dimmable smart light bulb; and
the downstream smart device detection signal is configured to instruct the dimmable smart light bulb to dim the dimmable smart light bulb according to a predetermined dimming sequence.

5. The computer-implemented method of claim 4, wherein:
the association signal comprises a dimming of the dimmable smart light bulb according to the predetermined dimming sequence; and
the computer-implemented method further comprises:
in response to detecting the dimming of the dimmable smart light bulb according to the predetermined dimming sequence, determining, by the at least one processor, that the downstream smart device is coupled to the electrical terminal of the electrical switching device and configured to receive the electricity in response to the actuation of the electrical switching device.

6. The computer-implemented method of claim 4, wherein:
the downstream smart device is configured to, in response to a receipt of the downstream smart device detection signal, transmit a control point association signal;
the association signal comprises the control point association signal; and
the computer-implemented method further comprises:
in response to receiving the control point association signal from the downstream smart device, determining, by the at least one processor, that the downstream smart device is coupled to the electrical terminal of the electrical switching device and configured to receive the electricity in response to the actuation of the electrical switching device.

7. A non-transitory computer-readable medium having instructions stored thereon that, when executed by at least one processor of an electrical load controlling device, cause the electrical load controlling device to perform operations comprising:
detecting an association signal from a downstream smart device responsive to a downstream smart device detection signal;
in response to detecting the association signal, determining whether the downstream smart device is coupled to an electrical terminal of an electrical switching device and configured to receive electricity in response to an actuation of the electrical switching device;
in response to determining that the downstream smart device is coupled to the electrical terminal of the electrical switching device and configured to receive the electricity in response to the actuation of the electrical switching device, generating a control signal configured to instruct the electrical switching device to prevent deactuating the electrical switching device; and
transmitting the control signal to the electrical switching device.

8. The non-transitory computer-readable medium of claim 7, wherein:
the downstream smart device detection signal is configured to instruct the downstream smart device to generate a predetermined sequence of power pulses;
the association signal comprises the predetermined sequence of power pulses; and
the operations further comprise:
in response to detecting the predetermined sequence of power pulses from the downstream smart device, determining that the downstream smart device is coupled to the electrical terminal of the electrical switching device and configured to receive the electricity in response to the actuation of the electrical switching device.

9. The non-transitory computer-readable medium of claim 7, wherein:
the downstream smart device detection signal is a first downstream smart device detection signal;
the first downstream smart device detection signal is configured to instruct the downstream smart device to transmit a communications signal; and
the operations further comprise:
transmitting a second downstream smart device detection signal to the electrical switching device,
wherein the second downstream smart device detection signal is configured to instruct the electrical switching device to actuate and deactuate the electrical switching device according to a predetermined actuation and deactuation sequence;
receiving, at a first time when the electrical switching device is actuated based on the second downstream smart device detection signal, the communications signal from the downstream smart device;
not receiving, at a second time, when the electrical switching device is deactuated based on the second downstream smart device detection signal, the communications signal from the downstream smart device; and in response to receiving the communications signal from the downstream smart device at the first time and not receiving the communications signal from the downstream smart device at the second time, determining that the downstream smart device is coupled to the electrical terminal of the electrical switching device and configured to receive the electricity in response to the actuation of the electrical switching device.

10. The non-transitory computer-readable medium of claim 7, wherein:

the downstream smart device is a dimmable smart light bulb; and the downstream smart device detection signal is configured to instruct the dimmable smart light bulb to dim the dimmable smart light bulb according to a predetermined dimming sequence.

11. The non-transitory computer-readable medium of claim 10, wherein:

the association signal comprises a dimming of the dimmable smart light bulb according to the predetermined dimming sequence; and the operations further comprise:

in response to detecting the dimming of the dimmable smart light bulb according to the predetermined dimming sequence, determining that the downstream smart device is coupled to the electrical terminal of the electrical switching device and configured to receive the electricity in response to the actuation of the electrical switching device.

12. The non-transitory computer-readable medium of claim 10, wherein:

the downstream smart device is configured to, in response to a receipt of the downstream smart device detection signal, transmit a control point association signal;

the association signal comprises the control point association signal; and the operations further comprise:

in response to receiving the control point association signal from the downstream smart device, determining that the downstream smart device is coupled to the electrical terminal of the electrical switching device and configured to receive the electricity in response to the actuation of the electrical switching device.

13. An apparatus, comprising:

a first electrical terminal configured to connect to a first ungrounded conductor and receive electricity from the first ungrounded conductor;

a second electrical terminal configured to connect to a second ungrounded conductor and transmit the electricity received from the first ungrounded conductor to the second ungrounded conductor in response to an actuation of an electrical switching device;

the electrical switching device, wherein the electrical switching device is configured to:

generate a conductive electrical path between the first electrical terminal and the second electrical terminal in response to the actuation of the electrical switching device; and generate a nonconductive electrical path between the first electrical terminal and the second electrical terminal in response to a deactuation of the electrical switching device;

a memory; and at least one processor coupled to the memory and configured to:

detect an association signal from a downstream smart device responsive to a downstream smart device detection signal;

in response to a detection of the association signal, determine whether the downstream smart device is coupled to the second ungrounded conductor and configured to receive the electricity from the second ungrounded conductor in response to the actuation of the electrical switching device;

in response to a determination that the downstream smart device is coupled to the second ungrounded conductor and configured to receive the electricity from the second ungrounded conductor in response to the actuation of the electrical switching device, generate a control signal configured to instruct the electrical switching device to prevent the deactuation of the electrical switching device; and transmit the control signal to the electrical switching device.

14. The apparatus of claim 13, wherein:

the downstream smart device detection signal is configured to instruct the downstream smart device to generate a predetermined sequence of power pulses;

the apparatus further comprises a power monitoring device configured to detect the predetermined sequence of power pulses;

the association signal comprises the predetermined sequence of power pulses; and the at least one processor is further configured to:

in response to a detection of the predetermined sequence of power pulses from the downstream smart device, determine that the downstream smart device is coupled to the second ungrounded conductor and configured to receive the electricity from the second ungrounded conductor in response to the actuation of the electrical switching device.

15. The apparatus of claim 13, wherein:

the downstream smart device detection signal is a first downstream smart device detection signal;

the first downstream smart device detection signal is configured to instruct the downstream smart device to transmit a communications signal; and the at least one processor is further configured to:

transmit a second downstream smart device detection signal to the electrical switching device, wherein the second downstream smart device detection signal is configured to instruct the electrical switching device to actuate and deactuate the electrical switching device according to a predetermined actuation and deactuation sequence;

receive, at a first time when the electrical switching device is actuated based on the second downstream smart device detection signal, the communications signal from the downstream smart device;

not receive, at a second time when the electrical switching device is deactuated based on the second downstream smart device detection signal, the communications signal from the downstream smart device; and in response to a receipt of the communications signal from the downstream smart device at the first time and no receipt of the communications signal from the downstream smart device at the second time, determine that the downstream smart device is coupled to the second ungrounded conductor and configured to receive the electricity from the second ungrounded conductor in response to the actuation of the electrical switching device.

16. The apparatus of claim 13, wherein:
the downstream smart device is a dimmable smart light bulb; and
the downstream smart device detection signal is configured to instruct the dimmable smart light bulb to dim the dimmable smart light bulb according to a predetermined dimming sequence.

17. The apparatus of claim 16, wherein:
the association signal comprises a dimming of the dimmable smart light bulb according to the predetermined dimming sequence; and
the at least one processor is further configured to:
in response to a detection of the dimming of the dimmable smart light bulb according to the predetermined dimming sequence, determine that the downstream smart device is coupled to the second ungrounded conductor and configured to receive the electricity from the second ungrounded conductor in response to the actuation of the electrical switching device.

18. The apparatus of claim 16, wherein:
the downstream smart device is configured to, in response to a receipt of the downstream smart device detection signal, transmit a control point association signal to the apparatus;
the association signal comprises the control point association signal; and
the at least one processor is further configured to:
in response to a receipt of the control point association signal from the downstream smart device, determine that the downstream smart device is coupled to the second ungrounded conductor and configured to receive the electricity from the second ungrounded conductor in response to the actuation of the electrical switching device.

19. The apparatus of claim 13, further comprising:
a third electrical terminal configured to connect to a grounding conductor; and
a fourth electrical terminal configured to connect to a grounded conductor and transmit a second portion of the electricity received from the first ungrounded conductor to the grounded conductor in response to a connection of the fourth electrical terminal to the grounded conductor.

20. The apparatus of claim 19, wherein:
the first ungrounded conductor is a line wire;
the second ungrounded conductor is a load wire;
the grounding conductor is a ground wire; and
the grounded conductor is a neutral wire.

* * * * *

UNITED STATES PATENT AND TRADEMARK OFFICE
CERTIFICATE OF CORRECTION

| | | |
|---|---|---|
| PATENT NO. | : 12,027,854 B2 | |
| APPLICATION NO. | : 17/977924 | |
| DATED | : July 2, 2024 | |
| INVENTOR(S) | : Garner et al. | |

It is certified that error appears in the above-identified patent and that said Letters Patent is hereby corrected as shown below:

In the Claims

In Column 21, Claim 3, Line 26, delete "time" and insert -- time, --, therefor.

Signed and Sealed this
Thirteenth Day of August, 2024

*Katherine Kelly Vidal*

Katherine Kelly Vidal
*Director of the United States Patent and Trademark Office*